(12) United States Patent
Kazama et al.

(10) Patent No.: US 6,598,774 B2
(45) Date of Patent: *Jul. 29, 2003

(54) OPTICAL FIBER CUTTING DEVICE

(75) Inventors: Junichi Kazama, Tokyo (JP); Reiji Oshima, Tokyo (JP)

(73) Assignee: The Furukawa Electric Co., Ltd.,, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/466,983

(22) Filed: Dec. 17, 1999

(65) Prior Publication Data

US 2002/0070256 A1 Jun. 13, 2002

(30) Foreign Application Priority Data

Jan. 5, 1999 (JP) ............................................. 11-000665

(51) Int. Cl.⁷ .............................. B26F 3/00; C03B 37/16
(52) U.S. Cl. ...................... 225/100; 225/96.5; 225/101; 225/105; 83/167
(58) Field of Search ............................ 83/167; 225/96, 225/96.5, 97, 100, 101, 2, 94.95, 102, 103, 104, 105, 106; 65/56, 105, 112, 174, 433, 435

(56) References Cited

U.S. PATENT DOCUMENTS

| | | | | |
|---|---|---|---|---|
| 4,017,013 A | * | 4/1977 | Hawk et al. | 225/96.5 |
| 4,202,475 A | * | 5/1980 | Hirai et al. | 225/96.5 X |
| 4,216,004 A | * | 8/1980 | Brehm et al. | 225/96.5 X |
| 4,257,546 A | * | 3/1981 | Benasutti | 225/96.5 |
| 4,445,632 A | * | 5/1984 | Margolin et al. | 225/96.5 X |
| 4,502,620 A | * | 3/1985 | Leiby | 225/96 X |
| 4,943,270 A | * | 7/1990 | Fleckenstein | 83/167 X |
| 5,078,032 A | * | 1/1992 | Gerlach | 83/167 |
| 5,123,581 A | * | 6/1992 | Curtis et al. | 225/96.5 X |
| 5,129,567 A | * | 7/1992 | Suda et al. | 225/96.5 |
| 5,188,268 A | * | 2/1993 | Hakoun et al. | 225/96.5 |
| 5,839,635 A | * | 11/1998 | Mansfield et al. | 225/96.5 |
| 5,842,622 A | * | 12/1998 | Mansfield et al. | 225/96.5 |

FOREIGN PATENT DOCUMENTS

| | | |
|---|---|---|
| JP | 61-111278 | 2/1988 |
| JP | 62-92322 | 12/1988 |
| JP | 62-268727 | 4/1989 |
| JP | 04-60970 | 2/1993 |
| JP | 10-19097 | 6/2000 |

OTHER PUBLICATIONS

Cutting Tool For Single/Multi Fibers, Suda et al., 1985.

* cited by examiner

Primary Examiner—Clark F. Dexter
(74) Attorney, Agent, or Firm—Oliff & Berridge, PLC

(57) ABSTRACT

The present invention provides an optical fiber cutting device in which a scratch is formed in an outer peripheral surface of a clamped optical fiber, and the optical fiber is broken along the scratch by applying a tension force or bending stress to the optical fiber so that a cut surface becomes a mirror surface, the optical fiber cutting device comprising a collecting container capable of containing a waste fiber obtained by the cuffing, pinch rollers for conveying and collecting the waste fiber into the collecting container, and a drive mechanism for rotatingly driving the pinch rollers in response to a movement of a portion movable when cutting the optical fiber. The collecting container can be mounted and dismounted with respect to the outer container integrally formed with a device body. A slit through for setting the optical fiber is formed in the collecting container. Guide surfaces for guiding the optical fiber are formed on both outer sides of the slit. Lower ends of the guide surfaces are alternately shifted with respect to each other in an up-and-down direction.

7 Claims, 11 Drawing Sheets

OPTICAL FIBER CUTTING DEVICE

BACKGROUND OF THE INVENTION

1. Field of the Invention

The present invention relates to a cutting device for cutting an optical fiber, and more particularly, it relates to an optical fiber cutting device in which an optical fiber can be cut off so that a cut surface becomes a mirror surface, and a cut and separated optical fiber portion (referred to as "waste fiber" hereinafter) can automatically be collected.

2. Related Background Art

Generally, in optical fiber cutting techniques, a scratch is formed in an outer peripheral surface of a peeled portion of an optical fiber (from which a coating is partially peeled), and, thereafter, by applying a tension force or bending stress onto an area (of the optical fiber) including the scratch, the optical fiber is broken along the scratch. In this case, a cut surface becomes a mirror surface, which is an end face suitable to splice optical fibers together. Optical fiber cutting devices capable of performing such an operation are well-known. An example of such a known optical fiber cutting device is shown in FIGS. 12A and 12B. In this cutting device, a lid G is pivotally connected to a body M of the cutting device for pivotal movement around an axis X—X (FIG. 12A) between a open condition shown in FIG. 12A and a closed condition shown in FIG. 12B. Further, the body M is provided with receiving portions E, F and the lid G is provided with hold-down portions H, I so that a clamp B is constituted by the receiving portion E and the hold-down portion H and a clamp C is constituted by the receiving portion F and the hold-down portion I. In this optical fiber cutting device, after a coating P of an optical fiber O is clamped by a clamp L of the body M and an optical fiber peeled portion (exposed portion) A of the optical fiber O is rested on the receiving portions E, F, when the lid G is closed around the axis X—X to reach the closed condition shown in FIG. 12B, the optical fiber peeled portion A is clamped by the receiving portions E, F and the hold-down portions H, I. In this condition, a blade J provided between the receiving portions E and F is slid laterally toward the optical fiber peeled portion A to form a scratch in an outer peripheral surface of the optical fiber peeled portion A. When an area of the peeled portion including the scratch is pressed from the above by means of a pushing tool K provided on the lid G to apply bending stress to the optical fiber peeled portion A, the optical fiber peeled portion A is broken along the scratch.

In the optical fiber cutting device shown in FIGS. 12A and 12B, although the optical fiber peeled portion A is clamped by the clamps B, C during the cutting operation, when the lid G is opened, since the clamping forces of the clamps B, C are released, a cut-off portion of the optical fiber peeled portion A (waste fiber) is dropped from the cutting device or remains on the receiving portion F of the clamp C, which causes the following disadvantages.

(1) It is necessary that the dropped waste fiber be picked up by operator's fingers or tweezers and then be dumped in a dust box, which is troublesome;

(2) When the waste fiber is picked up, the waste fiber having a small diameter and a sharp cut edge can pierce the operator's finger to injure the latter; and (3) Since the waste fiber is relatively short and is transparent, it is difficult and troublesome for the operator to search or look up and pick up it.

SUMMARY OF THE INVENTION

An object of the present invention is to provide an optical fiber cutting device in which a cut and waste fiber can automatically be collected in a collecting container, and waste fibers can be dumped at a dumping location without transporting the optical fiber cutting device itself or the collecting container.

According to a first aspect of the present invention, there is provided an optical fiber cutting device in which a scratch is formed in an outer peripheral surface of a clamped optical fiber, and the optical fiber is broken along the scratch by applying a tension force or bending stress to the optical fiber so that a cut surface becomes a mirror surface, the optical fiber cutting device comprising a collecting container disposed near a waste fiber obtained by the cutting and capable of containing the waste fiber, pinch rollers for conveying and collecting the waste fiber into the collecting container, and a drive mechanism for rotatingly driving the pinch rollers in response to a movement of a portion movable when cutting the optical fiber.

According to a second aspect of the present invention, in the optical fiber cutting device, the drive mechanism rotatingly drives the pinch rollers only in a direction along which the waste fiber is sent into the collecting container.

According to a third aspect of the present invention, the optical fiber cutting device includes an anvil for applying the tension force or bending stress to the optical fiber, and the drive mechanism rotatingly drives the pinch rollers in response to a movement of the anvil.

According to a fourth aspect of the present invention, the optical fiber cutting device includes a clamp operation tool capable of clamping and unclamping the optical fiber, and the drive mechanism rotatingly drives the pinch rollers in response to a movement of the clamp operation tool.

According to a fifth aspect of the present invention, the optical fiber cutting device includes a collecting container for collecting a cut and separated optical fiber, and the collecting container is removable from other portions independently.

According to a sixth aspect of the present invention, in the optical fiber cutting device, the collecting container can be mounted and dismounted with respect to an outer container integrally formed with other portion.

According to a seventh aspect of the present invention, in the optical fiber cutting device, a slit through which the optical fiber can be inserted into the collecting container is formed in an upper surface of the collecting container.

According to an eighth aspect of the present invention, in the optical fiber cutting device, guide surfaces for guiding the optical fiber to the slit are formed on both outer sides of the slit.

According to a ninth aspect of the present invention, in the optical fiber cutting device, lower ends of the guide surfaces are alternately shifted with respect to each other in an up-and-down direction.

DETAILED DESCRIPTION OF THE PREFERRED EMBODIMENTS

First Embodiment

Figure 1:
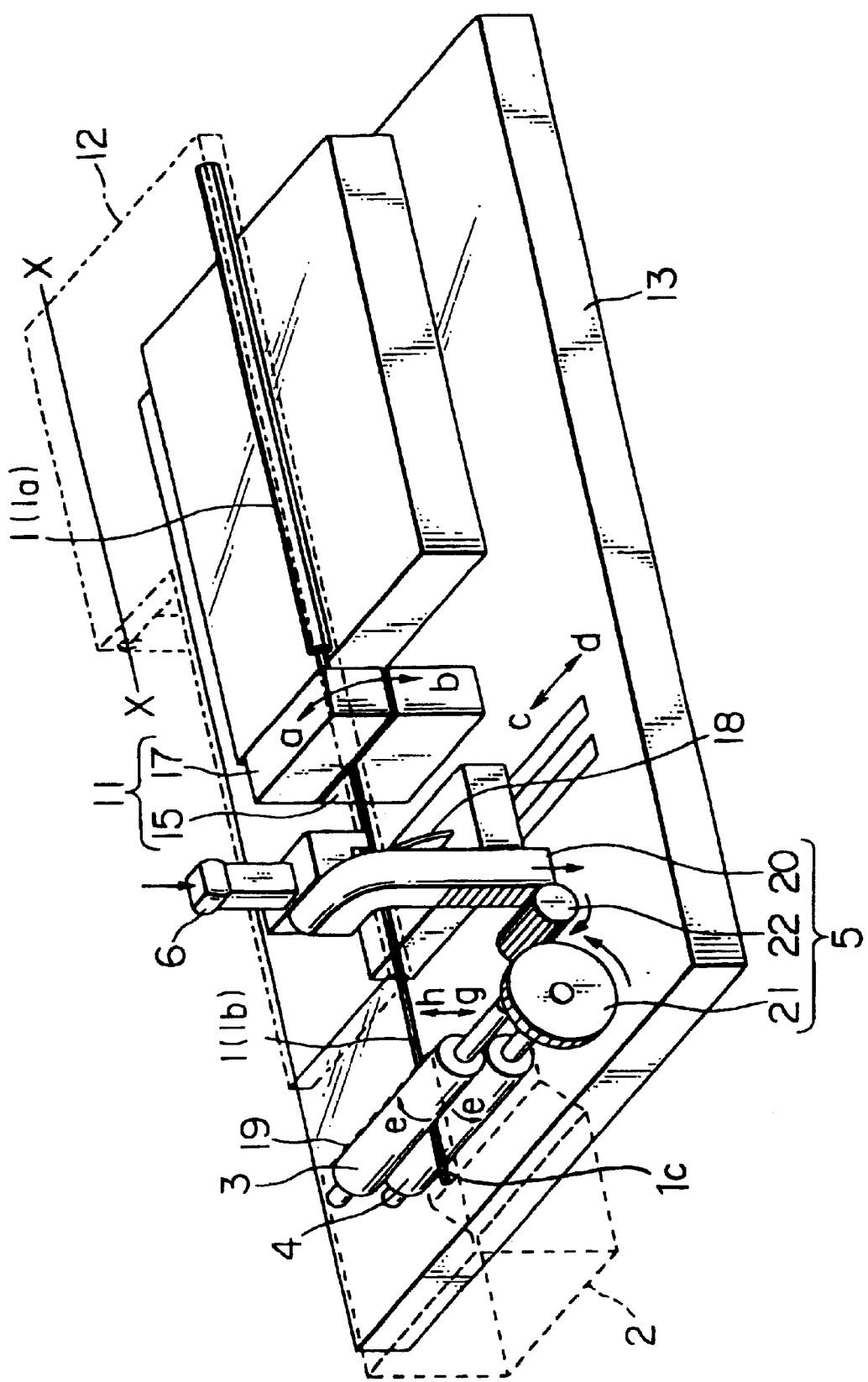
FIG. 1 is a perspective view showing an optical fiber cutting device according to a first embodiment of the present invention.

FIG. 1 and FIGS. 2A to 2C show an optical fiber cutting device according to a first embodiment of the present invention. The optical fiber cutting device comprises a clamp (not shown) for pinching and holding a coated portion 1a of an optical fiber 1 on a device body, a clamp 11 for pinching and holding a portion 1b of the optical fiber 1 from which the coating is peeled (referred to as "optical fiber peeled portion" hereinafter), a collecting container 2 for containing a cut and separated portion 1c of the optical fiber (referred to as "waste fiber" hereinafter), upper and lower pinch rollers 3, 4 for sending the waste fiber 1c into the collecting container 2, an anvil 6 for breaking the optical fiber along a scratch by applying a tension force or bending stress to the optical fiber 1, and a drive mechanism 5 for rotatingly driving the pinch rollers 3, 4 in response to a movement of the anvil.

In the clamp 11 for pinching and holding the optical fiber peeled portion 1b, in response to opening/closing operation of a lid 12 opened and closed around an axis X—X, a receiving portion 15 secured to a base 13 and a hold-down portion 17 secured to the lid 12 are relatively opened and closed along directions a–b in FIG. 1, thereby unclamping/clamping a proximal end portion of the optical fiber peeled portion 1b. In response to the opening/closing operation of the lid 12, the pinch rollers 3, 4 are also opened and closed along directions g–h, thereby unclamping/clamping a distal end portion of the optical fiber peeled portion 1b. In the device body, between the pinch rollers 3, 4 and the clamp 11, a blade 18 is attached to the base 13 and can be slid on the base straight along directions c–d, a sharp scratch can be formed in a lower side of the optical fiber peeled portion 1b clamped by the pinch rollers 3, 4 and the clamp 11, by means of the blade 18.

Further, in a longitudinal direction of the lid 12, between the pinch rollers 3, 4 and the clamp 11, the anvil 6 is attached, which is capable of linearly moving in a vertical direction in a condition that the lid 12 is closed, so that, when the anvil 6 is pressed downwardly by the operator's hand or finger, the bending stress can be applied to the clamped optical fiber peeled portion 1b, with the result that the optical fiber peeled portion 1b having the scratch formed by the blade 18 can be broken along the scratch. The anvil 6 is always biased upwardly by a biasing means such as a spring 6a, so that, when the finger or hand's pressure is released, the anvil is automatically lifted.

Figure 2A:
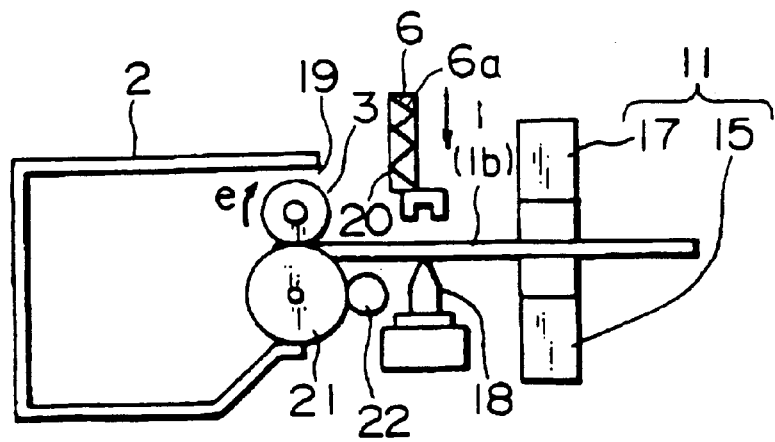
FIGS. 2A, 2B and 2C are operation explaining views showing a movement of the cutting device of FIG. 1 sequentially.

As shown in FIG. 1, the collecting container 2 is located near a tip end of the optical fiber 1 set in the device body, so that, when the optical fiber 1 is set in the device body, the tip end of the optical fiber 1 can slightly be inserted into a collecting opening 19 of the collecting container 2, as shown in FIG. 2A. The collecting container 2 has capacity for containing a number of elongated waste fibers 1c (FIG. 2C) separated from the optical fiber 1. For example, the collecting container 2 may be removable with respect to the device body so that the collected waste fibers 1c can be dumped without shifting the device body itself. In this case, if a discharge opening for discharging the waste fibers 1c collected in the collecting container 2 is provided, easy dumping can be achieved.

The pinch rollers 3, 4 are located in the vicinity of the collecting opening 19 of the collecting container 2, and the pinch roller 3 is biased toward the pinch roller 4 by a spring (not shown) and the like. The pinch roller 3 can be lifted upwardly by the operator's fingers or hands, so that, when the optical fiber 1 is set in the device body and the pinch roller 3 is lifted, the tip end of the optical fiber 1 can easily be inserted between the pinch rollers 3 and 4. Although the pinch rollers 3, 4 can be formed from rubber, resin or metal, it is desirable that outer surface layers of the rollers be formed from rubber to facilitate the gripping and sending of the waste fiber 1c.

Figure 2B:
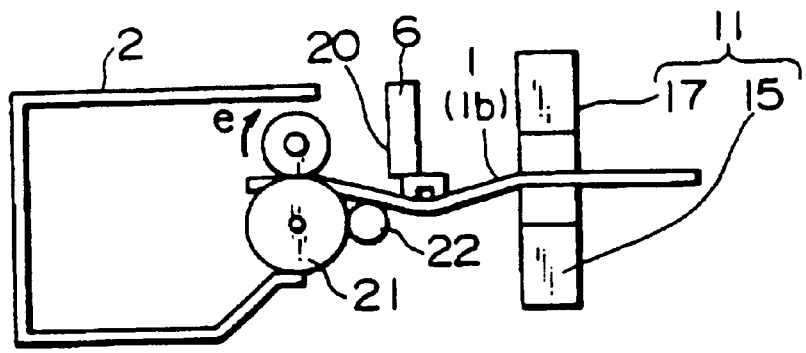
Figure 2C:
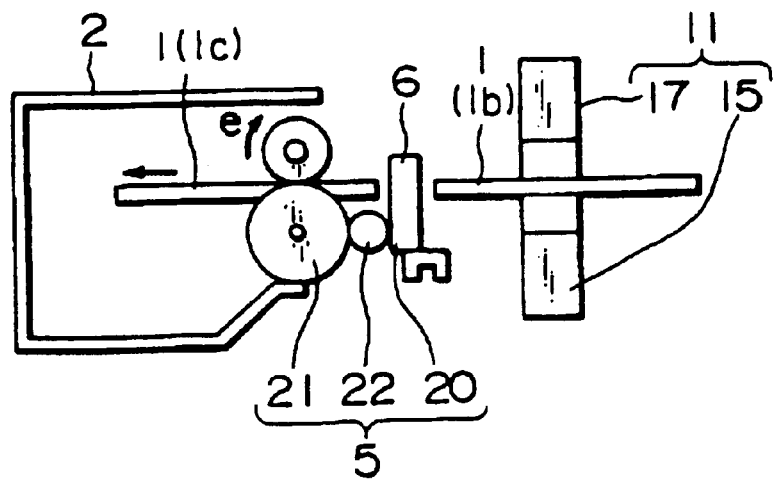

The drive mechanism 5 serves to rotatingly drive the pinch rollers 3, 4 in a direction shown by the arrow e in FIGS. 1 and 2 in response to the movement of the anvil 6 and comprises a rack gear 20 attached to the anvil 6, a gear 21 attached to a rotary shaft of the pinch roller 4, and a gear 22 disposed between the rack gear 20 and the gear 21. As shown in FIGS. 2A and 2B, although the gears 21, 22 are always meshed with each other, the gear 22 and the rack gear 20 are not meshed with each other until a lower end of the anvil 6 is pressed downwardly up to a position where the cutting of the optical fiber peeled portion 1b is completed, and, as shown in FIG. 2C, these gears are meshed with each other after the completion of the cutting. That is to say, the pinch roller 4 is rotated in the direction e after the fiber cutting to convey the waste fiber 1c into the collecting container 2. Further, diameters and teeth numbers of the gears 21, 22 are selected so that the waste fiber 1c can completely be sent into the collecting container 2 only by the single pressing-down operation of the anvil 6. The pinch roller 3 is rotatingly driven by a friction force between the pinch rollers 3 and 4.

In the drive mechanism 5, a one-way clutch (not shown) may be incorporated into either one of the gear 21 or gear 22 so that the pinch roller 4 can be rotatingly driven only in the direction e in FIG. 1 and FIGS. 2A to 2C. In this case, even if the pinch roller 4 cannot send the waste fiber 1e into the collecting container 2 completely by the single pressing-down operation (i.e., even if the waste fiber 1c remains to be pinched between the pinch rollers 3 and 4), by pressing the anvil 6 again, the waste fiber 1c can be sent into the collecting container 2.

The optical fiber cutting device according to the first embodiment is operated and used, for example, in the following manner:
(1) The pinch roller 3 is lifted, and then, the optical fiber peeled portion 1b is inserted between the pinch rollers 3 and 4.
(2) The lid 12 is closed to clamp the proximal end of the optical fiber peeled portion 1b by the clamp 11.
(3) The pinch roller 3 is closed to pinch the distal end of the optical fiber peeled portion 1b between the pinch rollers 3 and 4.
(4) The blade 18 is slid to form the scratch in the lower side of the optical fiber peeled portion 1b.
(5) The anvil 6 is pressed downwardly by the operator's hand or finger. The anvil 6 presses opposite sides of the scratch of the optical fiber peeled portion 1b to apply bending stress and resulting tension force to the optical fiber peeled portion 1b, thereby breaking the optical fiber peeled portion 1b. Then, the rack gear 20 engages by the gear 22 to rotate the gears 22, 21 and the pinch rollers 3, 4, thereby conveying the waste fiber 1c into the collecting container 2.

Although the above operation (2) may be effected earlier or later than the above operation (3), in general, the former is desirable because, when the pinch rollers 3, 4 are closed after the optical fiber peeled portion 1b was clamped by the clamp 11, an undesirable force (such as torsion) does not act on the area to be cut off.

Second Embodiment

Figure 3:
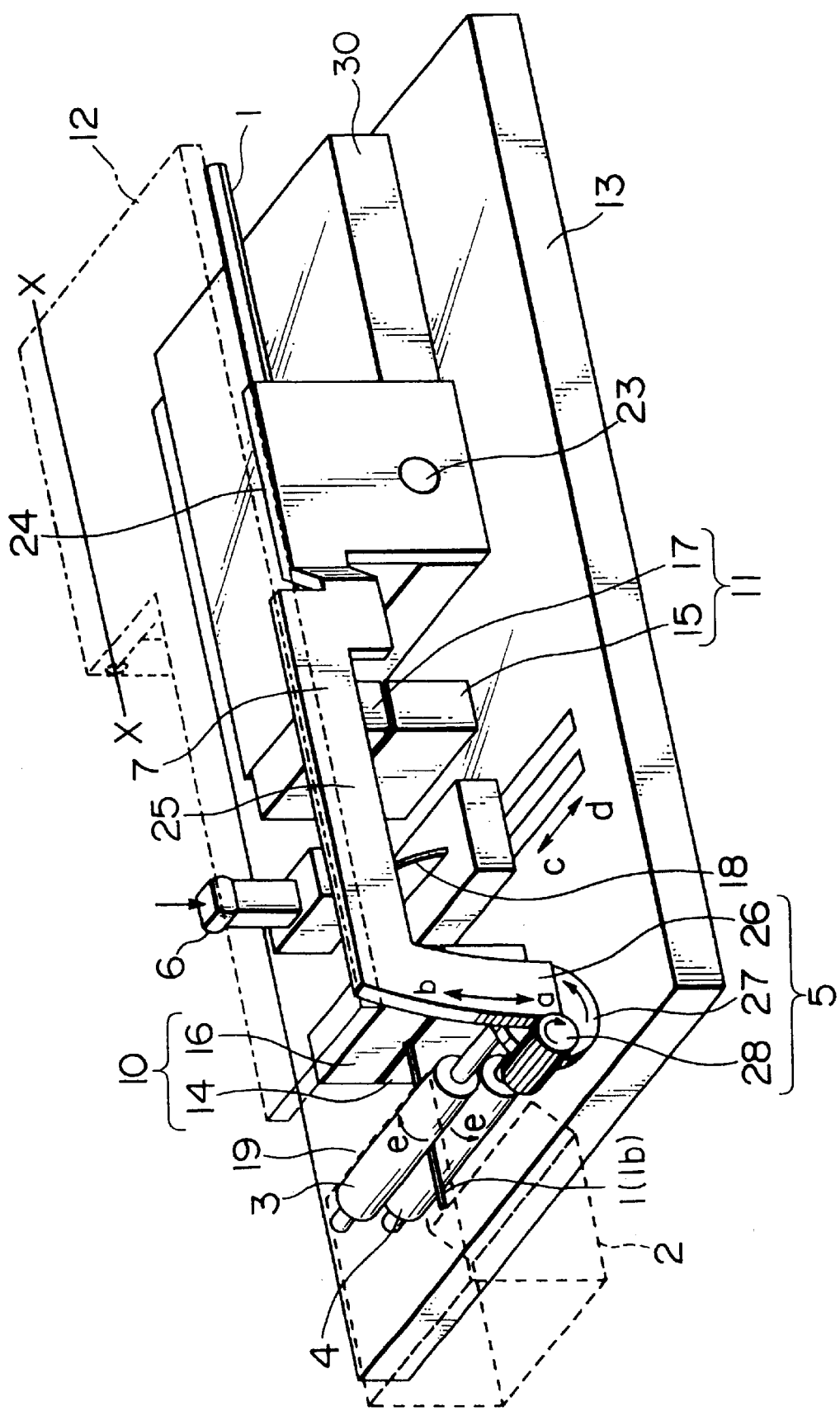
FIG. 3 is a perspective view showing an optical fiber cutting device according to a second embodiment of the present invention.
Figure 4A:
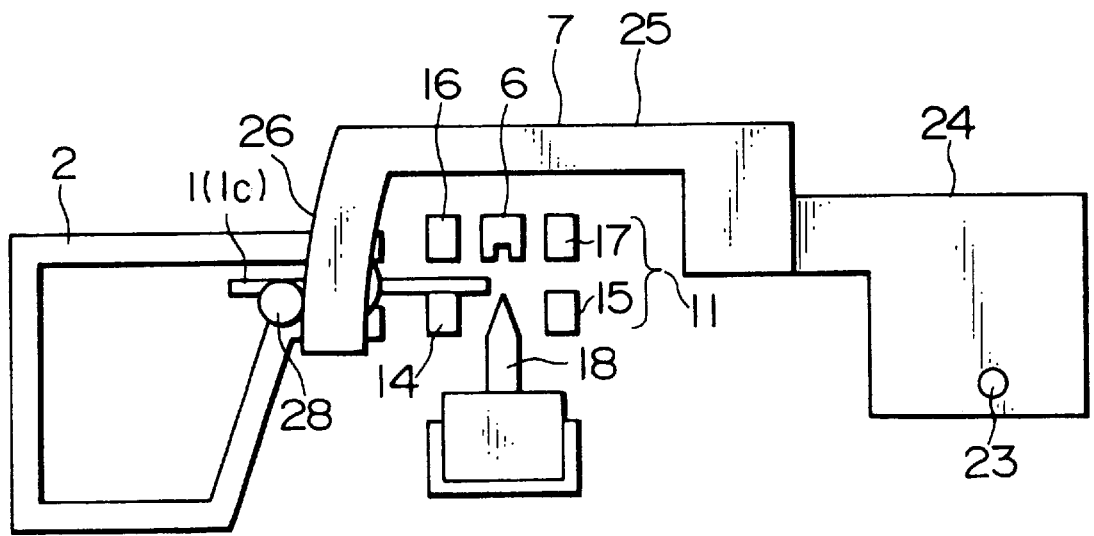
FIG. 4A is a partial view of the optical fiber cutting device of FIG. 3 looked at from a side.
Figure 4B:
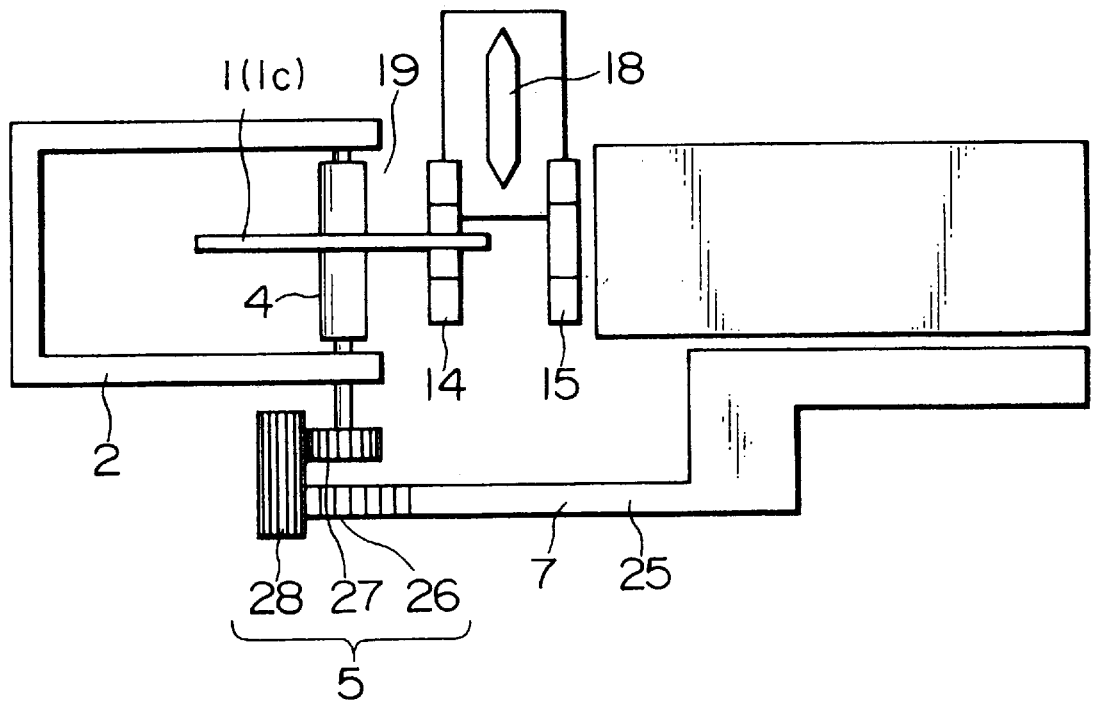
FIG. 4B is a partial view of the optical fiber cutting device of FIG. 3 looked at from above.
Figure 5B:
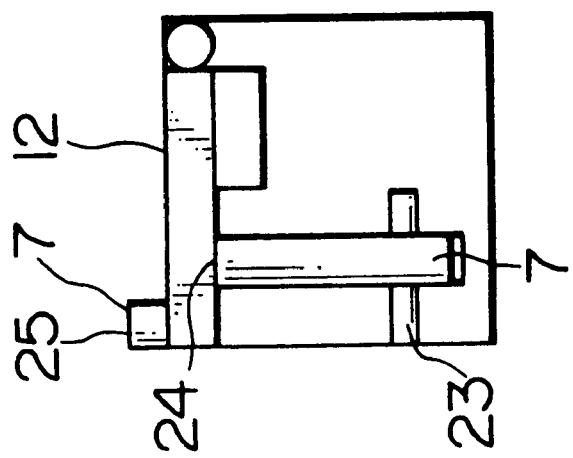
FIG. 5B is a partial rear view showing the relationship between the clamp operation tool and the lid.
Figure 5A:
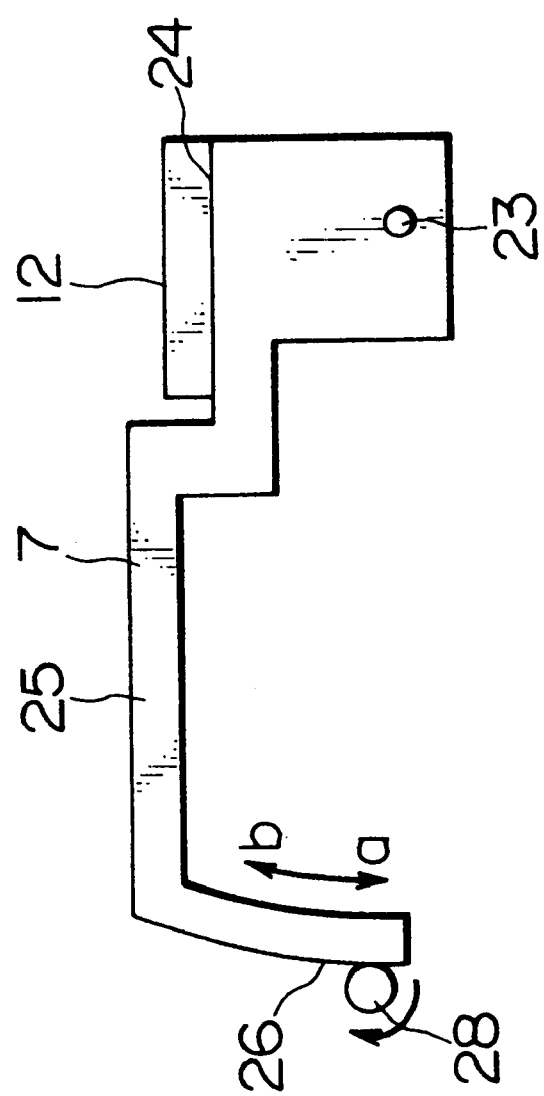
FIG. 5A is a partial side view showing a relationship between a clamp operation tool and a lid in the optical fiber cutting device according to the present invention.

FIG. 3, FIGS. 4A and 4B and FIGS. 5A and 5B show a second embodiment of an optical fiber cutting device according to the present invention. In the second embodiment, a device body of the optical fiber cutting device includes, in addition to the anvil 6 (but, not including the rack gear 20), a clamp 10, which includes receiving portion 14 and hold-down portion 16 and a clamp operation tool 7 for clamping/unclamping the optical fiber 1. The clamp operation tool 7 is rotatably attached to an attachment plate 30 on a base 13 via a support shaft 23 so that the tool 7 can be rotated around the support shaft 23 in directions a–b in FIG. 3. As shown in FIGS. 3, 5A and 5B, in the clamp operation tool 7, a portion of a lid 12 is rested on an upper edge of the tool 7 near the support shaft 23, and, when an elongated arm portion 25 of the tool 7 is pressed downwardly by the operator's hand or finger, the upper edge 24 is rotated upwardly around the support shaft 23, thereby lifting the lid 12. The lid 12 is provided with hold-down portions 16, 17 acting as upper members of the clamps 10, 11 so that, when the lid 12 is opened, the optical fiber 1 is unclamped from the clamps 10, 11.

As shown in FIGS. 3, 4A and 4B, a drive mechanism for rotatingly driving pinch rollers 3, 4 comprises an arcuate rack gear 26 provided on a tip end portion of the arm portion 25 of the clamp operation tool 7, a gear 27 attached to a rotary shaft of the pinch roller 4, and a gear 28 disposed between the rack gear 26 and the gear 27. The rack gear 26 has a curvature having a center as the support shaft 23 of the clamp operation tool 7 so that, when the arm portion 25 is pressed by the operator's hand or finger, the gear 28 is rotated to rotate the gear 27, thereby rotatingly driving the pinch roller 4. Also in this case, a one-way clutch may be incorporated into either one of the gear 27 or gear 28 so that the pinch roller 4 can be rotatingly driven only in one direction. The pinch roller 3 is rotatingly driven by a friction force between the pinch rollers 3 and 4.

The optical fiber cutting device according to the second embodiment is operated and used, for example, in the following manner:
(1) The pinch roller 3 is lifted, and then, the optical fiber peeled portion 1b is inserted between the pinch rollers 3 and 4.
(2) The lid 12 is closed to clamp the optical fiber peeled portion 1b by the clamps 10, 11.
(3) The pinch roller 3 is closed to pinch the distal end of the optical fiber peeled portion 1b between the pinch rollers 3 and 4.
(4) The blade 18 is slid to form the scratch in the lower side of the optical fiber peeled portion 1b.
(5) The anvil 6 is pressed downwardly by the operator's hand or finger. The anvil 6 presses opposite sides of the scratch of the optical fiber peeled portion 1b to apply bending stress and resulting tension force to the optical fiber peeled portion 1b, thereby breaking the optical fiber peeled portion 1b along the scratch.
(6) The arm portion 25 of the clamp operation tool 7 is pressed downwardly by the operator's hand or finger. The clamp operation tool 7 opens the lid 12 to unclamp the optical fiber peeled portion 1b and at the same time to rotate the gears 27, 28 thereby to rotate the pinch rollers 3, 4, thereby conveying the waste fiber 1c into the collecting container 2.

Although the above operation (2) may be effected earlier or later than the above operation (3), in general, the former is desirable because, when the pinch rollers 3, 4 are closed after the optical fiber 1 was clamped by the clamps 10, 11, an undesirable force (such as torsion) does not act on the area to be cut off.

The drive mechanism 6 according to the present invention is not limited to those in the first and second embodiments. For example, the pinch rollers 3, 4 may be rotated by utilizing the opening/closing operation of the lid 12 or other movement may be utilized. Even when the movement of the anvil 6 or the clamp operation tool 7 is utilized, a mechanism for transmitting such a movement to the pinch rollers 3, 4 is not limited to those in the first or second embodiment.

Third Embodiment

Figure 6A:
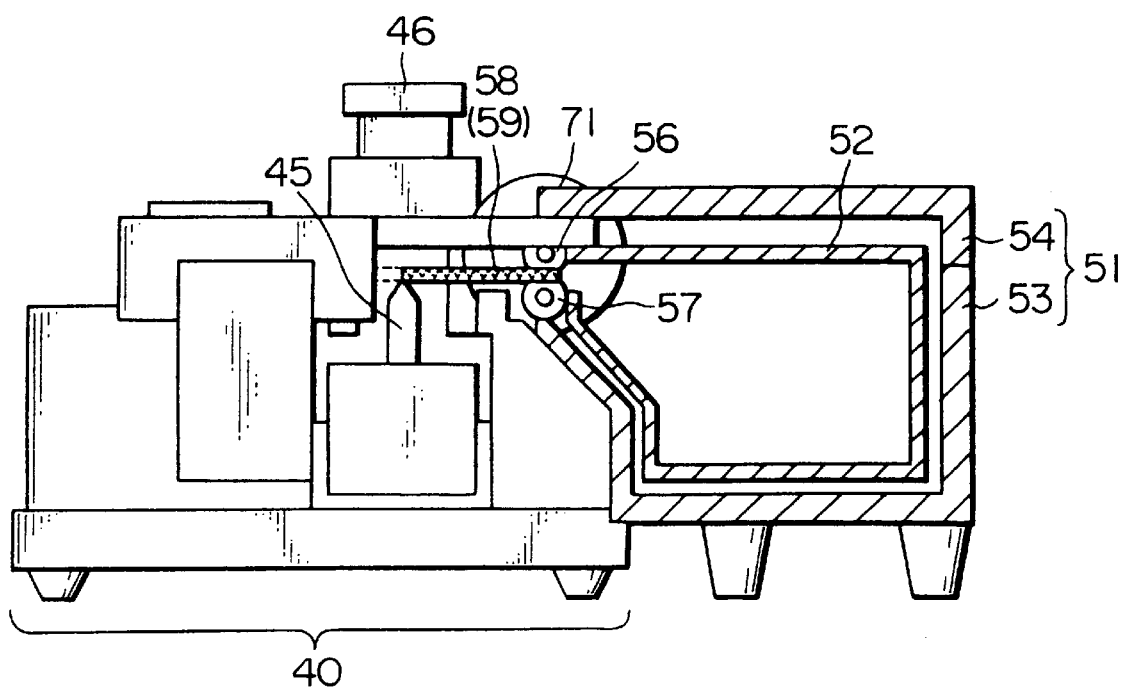
FIG. 6A is an explanatory view showing an optical fiber cutting device according to a third embodiment of the present invention.

An optical fiber cutting device according to a third embodiment of the present invention will now be fully explained with reference to FIGS. 6A and 6B, FIGS. 7A to 7C and FIG. 8. As shown in FIG. 6A, in the optical fiber cutting device, an outer container 51 is integrally formed with a device body 40, and a collecting container 52 capable of collecting the waste fiber separated by the device body 40 is detachably mounted to the outer container 51.

Figure 6B:
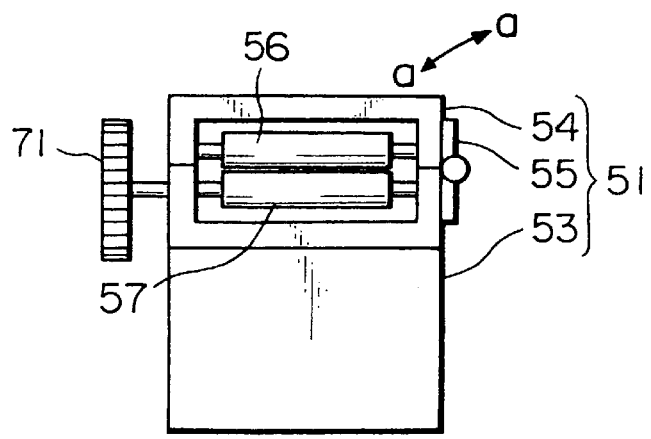
FIG. 6B is a front view showing an example of an outer container.

As shown in FIG. 6A, the outer container 51 is constituted by attaching an opening/closing lid member 54 to a box member 53 sized and configured to permit accommodation of the collecting container 52 and having an upper opening. As shown in FIG. 6B, the opening/closing lid member 54 is attached to the box member 53 via a hinge 55 for opening/closing movements in directions shown by the double-headed arrow a—a in FIG. 6B. Further, a pinch roller 56 is attached to a tip end portion of the opening/closing lid member 54 therewithin, and a pinch roller 57 is attached to a peripheral portion of the box member 53 which is opposed to the pinch roller 56 when the opening/closing lid member 54 is closed. The pinch roller 57 is urged against the pinch roller 56 by a spring (not shown) and the like so that an optical fiber peeled portion 59 of an optical fiber 58 can positively be pinched between the pinch rollers 56 and 57. Further, although the pinch rollers 56, 57 can be formed from rubber, resin or metal, it is desirable that the entire rollers be formed from rubber or at least outer surface layers of the rollers be formed from rubber to prevent the slipping of the optical fiber peeled portion 59. The pinch rollers 56. 57 can be rotatingly driven by a drive mechanism which will be described later.

Figure 7A:
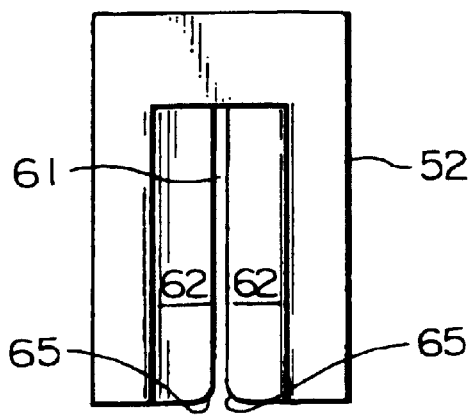
FIG. 7A is a plan view showing an example of a collecting container in the optical fiber cutting device according to the present invention.
Figure 7B:
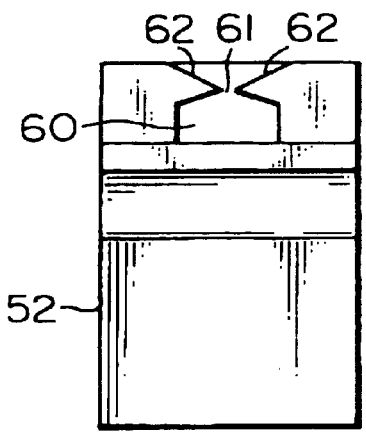
FIG. 7B is a front view of the collecting container.
Figure 7C:
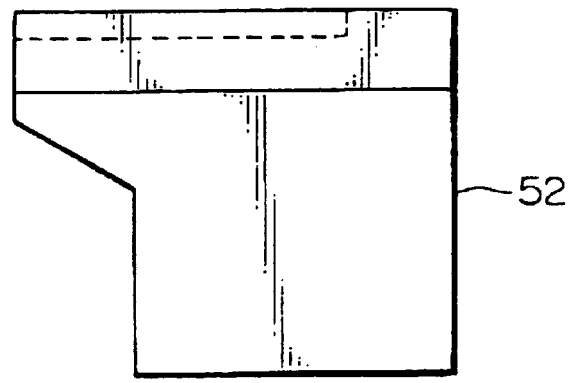
FIG. 7C is a side view of the collecting container.

As shown in FIGS. 7A to 7C, the collecting container 52 is formed as a box having a size and a configuration which can be inserted into and removed from the outer container 51, so that, when the opening/closing lid member 54 of the outer container 51 is opened, the collecting container 52 can be mounted within or dismounted from the box member 53. As shown in FIG. 7B, a side surface of the collecting container 52 opposed to the device body 40 is provided with an insertion hole 60 through which the optical fiber peeled portion 59 can be inserted, and an upper surface is provided with a slit 61 communicating with the insertion hole 60. Further, as shown in FIGS. 7A and 7B, guide surfaces 62 for guiding the optical fiber peeled portion 59 of the optical fiber 58 are provided on both sides of the slit 61.

Figure 8:
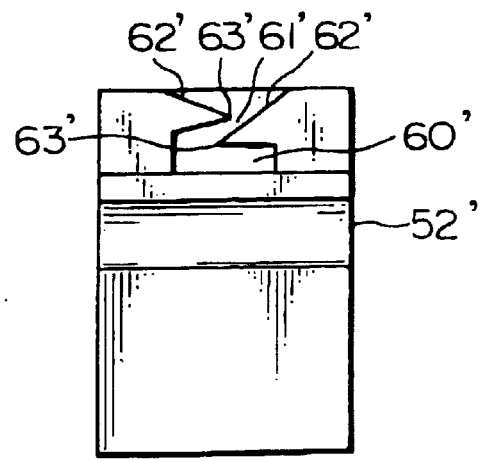
FIG. 8 is a front view showing another example of a collecting container in the optical fiber cutting device according to the present invention.

As shown in FIG. 7B, the guide surfaces 62 are inclined downwardly from both sides toward the slit 61 and lower edges of the guide surfaces are chamfered. With this arrangement, the optical fiber peeled portion 59 can smoothly be inserted into the slit 61 and the optical fiber peeled portion 59 which has been inserted into the collecting container 52 (insertion hole 60) through the slit 61 is prevented from escaping externally. As shown in FIG. 8, the opposed lower edges 63' of the guide surfaces 62' may be alternately shifted (i.e., offset) with respect to each other in an up-and-down direction. By doing so, the optical fiber inserted into the slit 61 can be inserted into the insertion hole 60 of the collecting container 52 more easily, and the optical fiber peeled portion 59 which has been inserted into the collecting container 52' is harder to be escaped externally. As shown in FIG. 7A, tip end faces 65 of the guide surfaces 62 are chamfered (Reformation).

The optical fiber cutting device according to the third embodiment is operated and used, for example, in the following manner:

(1) A lid 41 (FIG. 9) of the device body 40 and the opening/closing lid member 54 (FIGS. 6A and 6B) of the outer container 51 are rotated upwardly to open the lids, and the optical fiber peeled portion 59 of the optical fiber 58 is rested on receiving portions 43 (FIG. 9) of two clamps 42 and a distal end portion of the optical fiber peeled portion 59 is rested on the pinch roller 57 of the outer container 51. In this case, a tip end of the optical fiber peeled portion 59 is protruded toward the collecting container 52 beyond the pinch roller 57.

Figure 10:
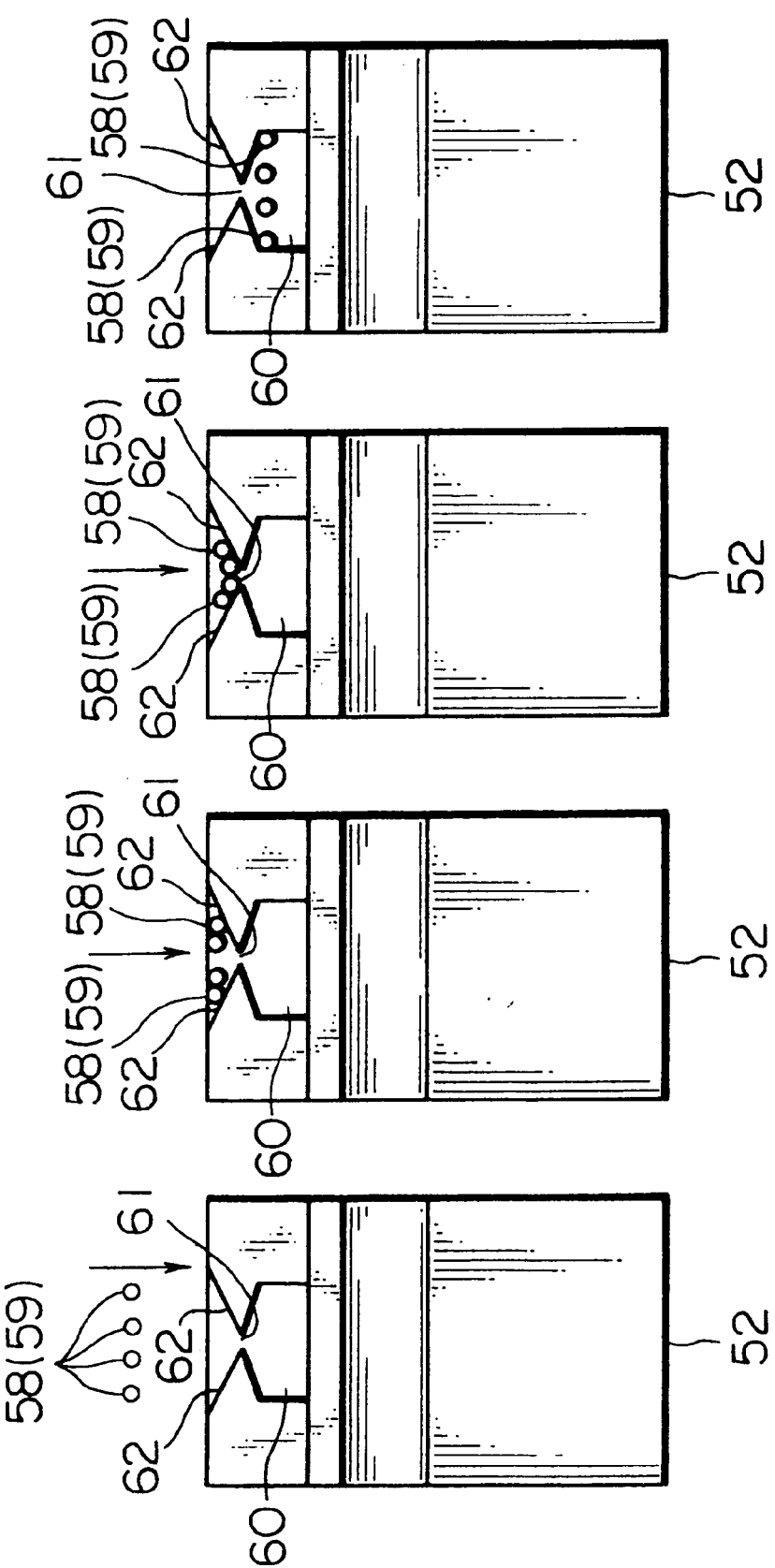
FIGS. 10A, 10B, 10C and 10D are explanatory views showing processes or steps for setting an optical fiber at an insertion hole of the collecting container in the optical fiber cutting device according to the present invention.

(2) The tip end portion of the optical fiber peeled portion 59 protruded toward the collecting container 52 beyond the pinch roller 57 is inserted within the collecting container 52 through the slit 61 of the collecting container 52 (FIG. 10A). In this case, as shown in FIG. 10A, when the optical fiber 58 has a multi ribbon fiber, the fiber cores are gathered centrally along the inclination surfaces of the guide surfaces 62 as shown in FIG. 10C and are collected into the collecting container 52 through the slit 61. After the collection, the fiber cores are restored to the original condition by restoring forces as shown in FIG. 10D.

Figure 9:
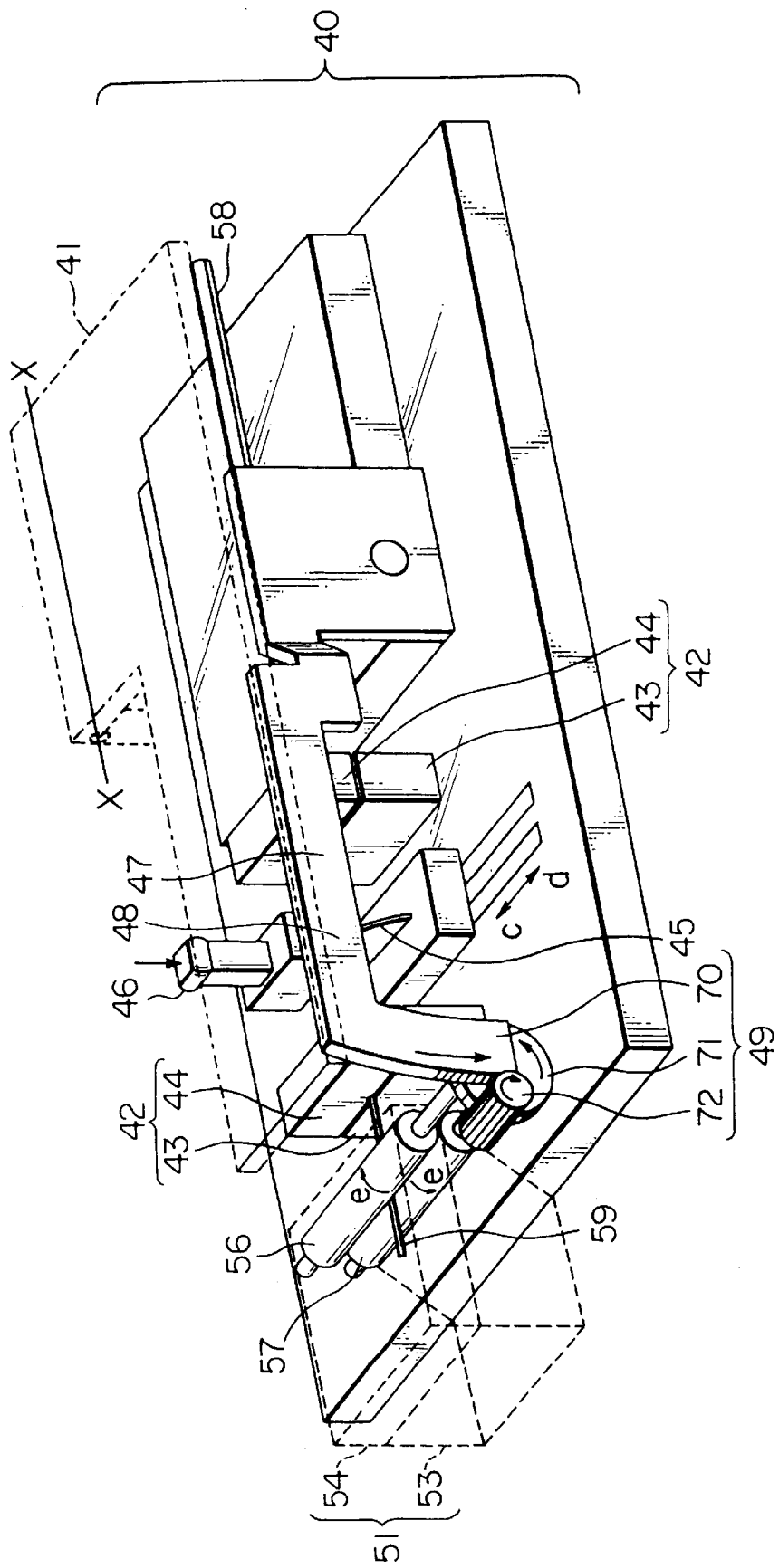
FIG. 9 is an explanatory view showing an example of a device body in the optical fiber cutting device according to the present invention.

(3) The lid 41 and the opening/closing lid member 54 are closed as shown in FIG. 9, so that the optical fiber peeled portion 59 is clamped by receiving portions 43 and hold-down portions 44 of two clamps 42 and by the pinch rollers 56, 57.

(4) A blade 45 (FIG. 9) of the device body 40 is slid to form a scratch in the lower side of the optical fiber peeled portion 59.

(5) Then, an anvil 46 is pressed downwardly by the operator's hand or finger to apply bending stress and resulting tension force to the optical fiber peeled portion 59, thereby breaking the optical fiber peeled portion 59 along the scratch. Thereafter, until an arm portion 48 of a clamp operation tool 47 is pressed downwardly the processes are the same as those in the optical fiber cutting device shown in FIG. 3.

(6) When the arm portion 48 of the clamp operation tool 47 is pressed downwardly, the pinch rollers 56, 57 are rotated by a drive mechanism 49, thereby conveying the waste fiber separated from the optical fiber peeled portion 59 into the collecting container 52.

(7) After the above-mentioned operation is repeated, if the collecting container 52 is filled with the waste fibers separated from the optical fiber peeled portion 59, the opening/closing lid member 54 of the outer container 51 is opened, and the collecting container 52 is dismounted from the outer container 51, and the waste fibers in the collecting container 52 are dumped.

Fourth Embodiment

Figure 11:
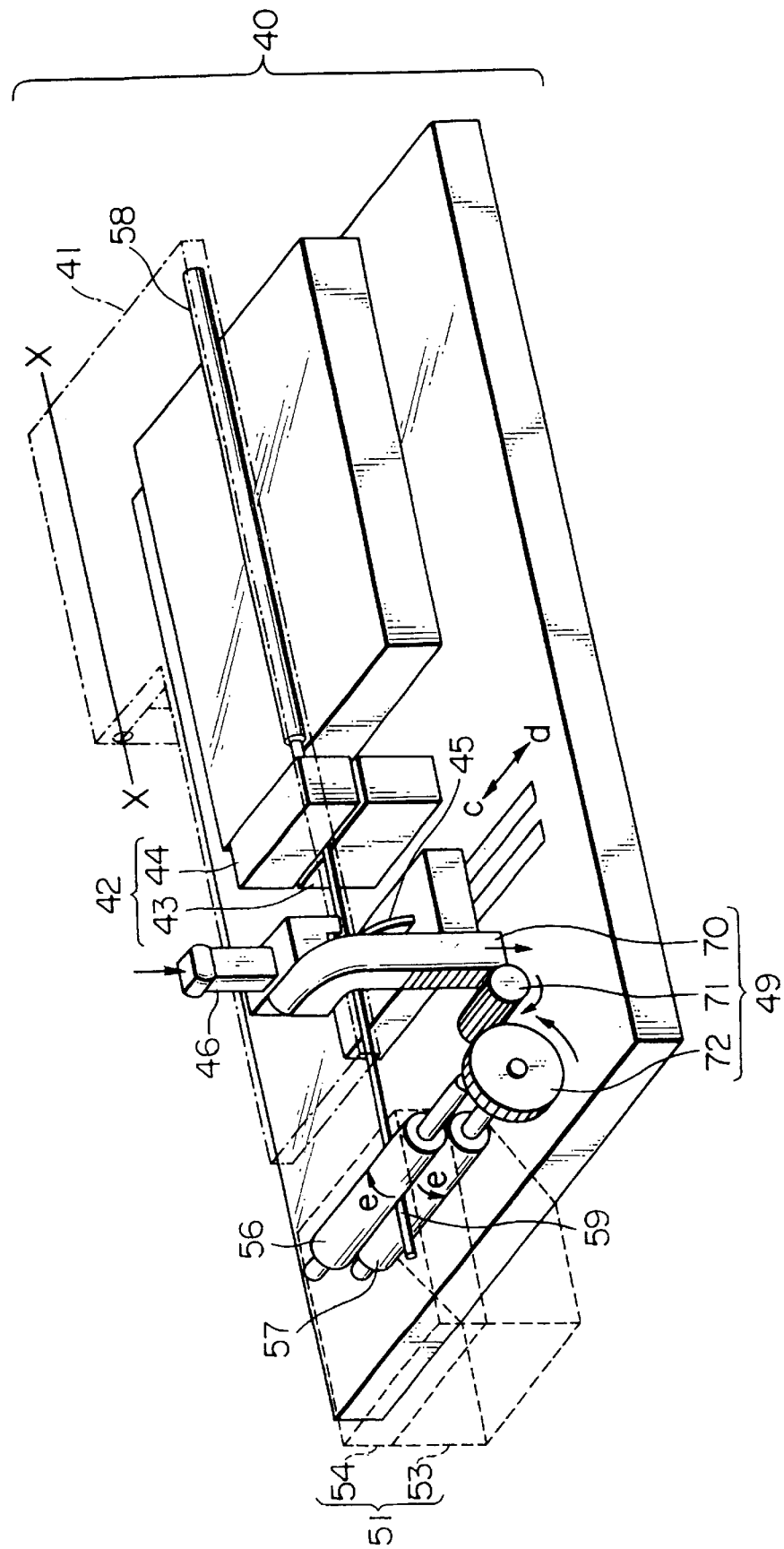
FIG. 11 is an explanatory view showing another example of a device body in the optical fiber cutting device according to the present invention.
Figure 12A:
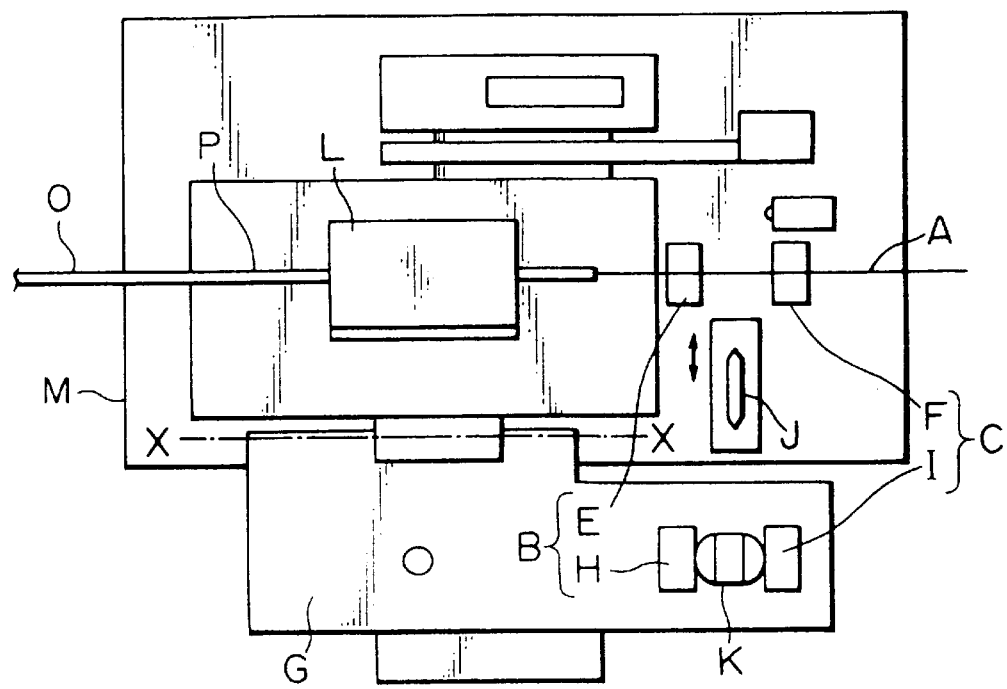
FIG. 12A is a front view showing an example of a conventional optical fiber cutting device.
Figure 12B:
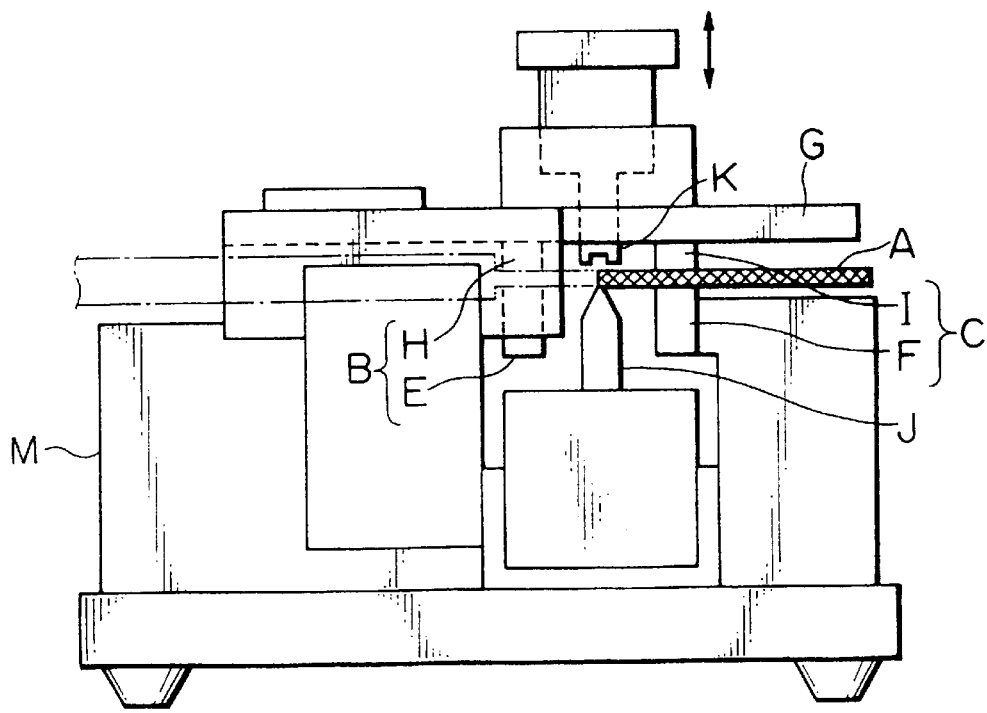
FIG. 12B is a sectional view of the conventional cutting device.

The drive mechanism 49 may be constructed as shown in FIG. 11. A drive mechanism 49 shown in FIG. 11 is designed in such a manner that a rack gear 70 provided on the clamp operation tool 47 in FIG. 9 is provided on the anvil 46 so that, when the anvil 46 is pressed downwardly, a gear 71 is rotated by the rack gear 70 to rotate a gear 72, thereby rotating the pinch rollers 56, 57. Even when the anvil 46 is pressed downwardly, the rack gear 70 and the gear 71 are not engaged by each other until a lower end of the anvil completes the cutting of the optical fiber peeled portion 59 and can be engaged by each other after the completion of the cutting. Further, diameters and teeth numbers of the gears 72, 71 are selected so that the waste fiber can completely be sent into the collecting container 52 only by the single pressing-down operation of the anvil 46.

The drive mechanism 49 is not limited to the illustrated ones, but, for example, the pinch rollers 56, 57 may be rotated by utilizing the opening/closing operation of the lid 41 or other movement may be utilized to rotate the pinch rollers 56, 57. In any cases, means for transmitting such a movement to the pinch rollers 56, 57 are not limited to gears. In order to prevent the blade 45 which has been moved linearly in a predetermined direction to form the scratch in the outer peripheral surface of the optical fiber peeled portion 59 from being moved linearly in a reverse direction to form a scratch in the outer peripheral surface of the optical fiber peeled portion 59 again, a reverse movement preventing mechanism (not shown) for preventing the reverse movement of the blade 45 may be provided.

In the third embodiment, while an example that the collecting container 52 can be mounted to and dismounted from the outer container 51 by providing the opening/closing lid 54 on the outer container 51 was explained, the collecting container 52 can be inserted into a predetermined position at a rear surface or a side surface of the outer container 51, or, a setting opening through which the collecting container 52 can be set may be provided.

Effect of the Invention

The optical fiber cutting devices according to first to ninth aspects of the present invention have the following advantages:

(1) In the optical fiber cutting devices according to first to third aspects, since the waste fiber is automatically collected into the collecting container by the pinch rollers, the waste fibers are not scattered in a surrounding environment, and all of troublesome operations for collecting the waste fibers can be eliminated, and the optical fiber cutting operation can be performed efficiently and safely.

(2) In the optical fiber cutting device according to the fourth aspect, even if the waste fiber cannot be collected into the collecting container by the single operation, the reverse movement of the waste fiber is prevented and the waste fiber can be collected into the collecting container by repeating such operation.

(3) In the optical fiber cutting device according to the fifth aspect, since the collecting container capable of collecting the waste fiber can be detached independently from other portions, the waste fibers can be dumped by transporting the collecting container alone to the damping place without transporting the device body and the collecting device.

(4) In the optical fiber cutting device according to the sixth aspect, since the collecting container can be mounted and dismounted with respect to the outer container, even when the opening/closing lid of the outer container is opened, the waste fibers in the collecting container are not scattered in the surrounding environment.

(5) In the optical fiber cutting device according to the seventh aspect, since the slit communicating with the insertion hole of the collecting container is formed in the upper surface of the collecting container, the optical fiber can easily be inserted into the insertion hole.

(6) In the optical fiber cutting device according to the eighth aspect, since the guide surfaces for guiding the optical fiber are formed on both sides of the slit, the optical fiber can be inserted into the insertion hole more easily, and, particularly, the fiber cores of the multi ribbon fiber can easily be inserted.

(7) In the optical fiber cutting device according to the ninth aspect, since the lower ends of the guide surfaces are alternately shifted with respect to each other in the up-and-down direction, the optical fiber can be inserted into the insertion hole more easily. Further, once the optical fiber has been inserted into the hole, it is hard to escape.

What is claimed is:

1. An optical fiber cutting device in which a scratch is formed in an outer peripheral surface of an optical fiber and the optical fiber is cut, comprising:

an anvil;

two clamps which are spaced from each other in an optical axis direction, the clamps clamping the optical fiber such that the scratch is disposed between the clamps, the anvil applying at least one of a tension force and a bending stress to brake the optical fiber at the scratch such that cut surfaces of the optical fiber are mirror surfaces of each other, and such that a waste fiber is provided as a front portion of the cut optical fiber, one of the two clamps being two pinch rollers which pinch the waste fiber, the anvil being disposed between the two clamps;

a biasing device;

the anvil being movable downwardly by press-down operation and upwardly by the biasing device upon termination of the press-down operation, a drive mechanism which connects the anvil and the pinch rollers such that downward movement of the anvil causes rotation of the pinch rollers; and a collecting container, which collects the waste fiber, disposed downstream of the pinch rollers, wherein by the anvil traveling downwardly, the bending stress or resulting tension force is applied to an adjacent portion of the scratch so that the optical fiber is broken at the scratched portion, the pinch rollers are rotated by said drive mechanism, and by the pinch rollers rotation, the waste fiber pinched by the pinch rollers is conveyed and collected into the collecting container.

2. An optical fiber cutting device in which a scratch is formed in an outer peripheral surface of an optical fiber and the optical fiber is cut, comprising:

an anvil;

two clamps which are spaced from each other in an optical axis direction, the clamps clamping the optical fiber such that the scratch is disposed between the clamps, the anvil applying at least one of a tension force and a bending stress to brake the optical fiber at the scratch such that cut surfaces of the optical fiber are mirror surfaces of each other, and such that a waste fiber is provided as a front portion of the cut optical fiber, one of the two clamps being two pinch rollers which pinch the waste fiber, the anvil being disposed between the two clamps;

a biasing device;

the anvil being movable downwardly by press-down operation and upwardly by the biasing device upon termination of the press-down operation;

a drive mechanism which connects the anvil and the pinch rollers such that downward movement of the anvil causes rotation of the pinch rollers; and a collecting container, which collects the waste fiber, disposed downstream of the pinch rollers, wherein by the anvil traveling downwardly, the bending stress or resulting tension force is applied to an adjacent portion of the scratch so that the optical fiber is broken at the scratched portion, the pinch rollers are rotated by said drive mechanism only in a direction along which the waste fiber is sent toward said collecting container, and by the pinch rollers rotation, the waste fiber pinched by the pinch rollers is conveyed and collected into the collecting container.

3. An optical fiber cutting device in which a scratch is formed in an outer peripheral surface of an optical fiber and the optical fiber is cut, comprising:

an anvil;

two clamps which are spaced from each other in an optical axis direction, the clamps clamping the optical fiber such that the scratch is disposed between the clamps, the anvil applying at least one of a tension force and a bending stress to brake the optical fiber at the scratch such that cut surfaces of the optical fiber are mirror surfaces of each other, and such that a waste fiber is provided as a front portion of the cut optical fiber, one of the two clamps being two pinch rollers which pinch the waste fiber, the anvil being disposed between the two clamps;

a biasing device;

the anvil being movable downwardly by press-down operation and upwardly by the biasing device upon termination of the press-down operation, a drive mechanism which connects the anvil and the pinch rollers such that downward movement of the anvil causes rotation of the pinch rollers, and a collecting container detachable from the optical fiber cutting device, which collects the waste fiber, disposed downstream of the pinch rollers, wherein by the anvil traveling downwardly, the bending stress or resulting tension force is applied to an adjacent portion of the scratch so that the optical fiber is broken at the scratched portion, the pinch rollers are rotated by said drive mechanism, and by the pinch rollers rotation, the waste fiber pinched by the pinch rollers is conveyed and collected into the collecting container.

4. An optical fiber cutting device in which a scratch is formed in an outer peripheral surface of an optical fiber and the optical fiber is cut, comprising:

an anvil;

two clamps which are spaced from each other in an optical axis direction, the clamps clamping the optical fiber such that the scratch is disposed between the clamps, the anvil applying at least one of a tension force and a bending stress to brake the optical fiber at the scratch such that cut surfaces of the optical fiber are mirror surfaces of each other, and such that a waste fiber is provided as a front portion of the cut optical fiber, one of the two clamps being two pinch rollers which pinch the waste fiber, the anvil being disposed between the two clamps;

a biasing device;

the anvil being movable downwardly by press-down operation and upwardly by the biasing device upon termination of the press-down operation, a drive mechanism which connects the anvil and the pinch rollers such that downward movement of the anvil causes rotation of the pinch rollers, and a collecting container, which collects the waste fiber, dismountable from an outer container integrally formed with optical fiber cutting device and disposed downstream of the pinch rollers, wherein by the anvil traveling downwardly, the bending stress or resulting tension force is applied to an adjacent portion of the scratch so that the optical fiber is broken at the scratched portion, the pinch rollers are rotated by said drive mechanism, and by the pinch rollers rotation, the waste fiber pinched by the pinch rollers is conveyed and collected into the collecting container.

5. An optical fiber cutting device in which a scratch is formed in an outer peripheral surface of an optical fiber and the optical fiber is cut, comprising:

an anvil;

two clamps which are spaced from each other in an optical axis direction, the clamps clamping the optical fiber such that the scratch is disposed between the clamps, the anvil applying at least one of a tension force and a bending stress to brake the optical fiber at the scratch such that cut surfaces of the optical fiber are mirror surfaces of each other, and such that a waste fiber is provided as a front portion of the cut optical fiber, one of the two clamps being two pinch rollers which pinch the waste fiber, the anvil being disposed between the two clamps;

a biasing device;

the anvil being movable downwardly by press-down operation and upwardly by the biasing device upon termination of the press-down operation, a drive mechanism which connects the anvil and the pinch rollers such that downward movement of the anvil causes rotation of the pinch rollers, and a collecting container, which collects the waste fiber, disposed downstream of the pinch rollers, wherein by the anvil traveling downwardly, the bending stress or resulting tension force is applied to an adjacent portion of the scratch so that the optical fiber is broken at the scratched portion, the pinch rollers are rotated by said drive mechanism, and by the pinch rollers rotation, the waste fiber pinched by the pinch rollers is conveyed and collected into the collecting container, and wherein said collecting container is dismountable from an outer container integrally formed with said optical fiber cutting device, and a slit through which the optical fiber can be inserted into said collecting container is formed in an upper surface of said collecting container.

6. An optical fiber cutting device in which a scratch is formed in an outer peripheral surface of an optical fiber and the optical fiber is cut, comprising:

an anvil;

two clamps which are spaced from each other in an optical axis direction, the clamps clamping the optical fiber such that the scratch is disposed between the clamps, the anvil applying at least one of a tension force and a bending stress to brake the optical fiber at the scratch such that cut surfaces of the optical fiber are mirror surfaces of each other, and such that a waste fiber is provided as a front portion of the cut optical fiber, one of the two clamps being two pinch rollers which pinch the waste fiber, the anvil being disposed between the two clamps;

a biasing device;

the anvil being movable downwardly by press-down operation and upwardly by the biasing device upon termination of the press-down operation, a drive mechanism which connects the anvil and the pinch rollers such that downward movement of the anvil causes rotation of the pinch rollers, and a collecting container, which collects the waste fiber, disposed downstream of the pinch rollers, wherein by the anvil traveling downwardly, the bending stress or resulting tension force is applied to an adjacent portion of the scratch so that the optical fiber is broken at the scratched portion, the pinch rollers are rotated by said drive mechanism, and by the pinch rollers rotation, the waste fiber pinched by the pinch rollers is conveyed and collected into the collecting container; and wherein said collecting container is dismountable from an outer container integrally formed with said optical fiber cutting device, and a slit through which the optical fiber can be inserted into said collecting container is formed in an upper surface of said collecting container, and guide surfaces for guiding the optical fiber to said slit are formed on both outer sides of said slit.

7. An optical fiber cutting device according to claim 6, wherein lower ends of said guide surfaces are offset with respect to each other in an up-and-down direction.

* * * * *